UNITED STATES PATENT OFFICE.

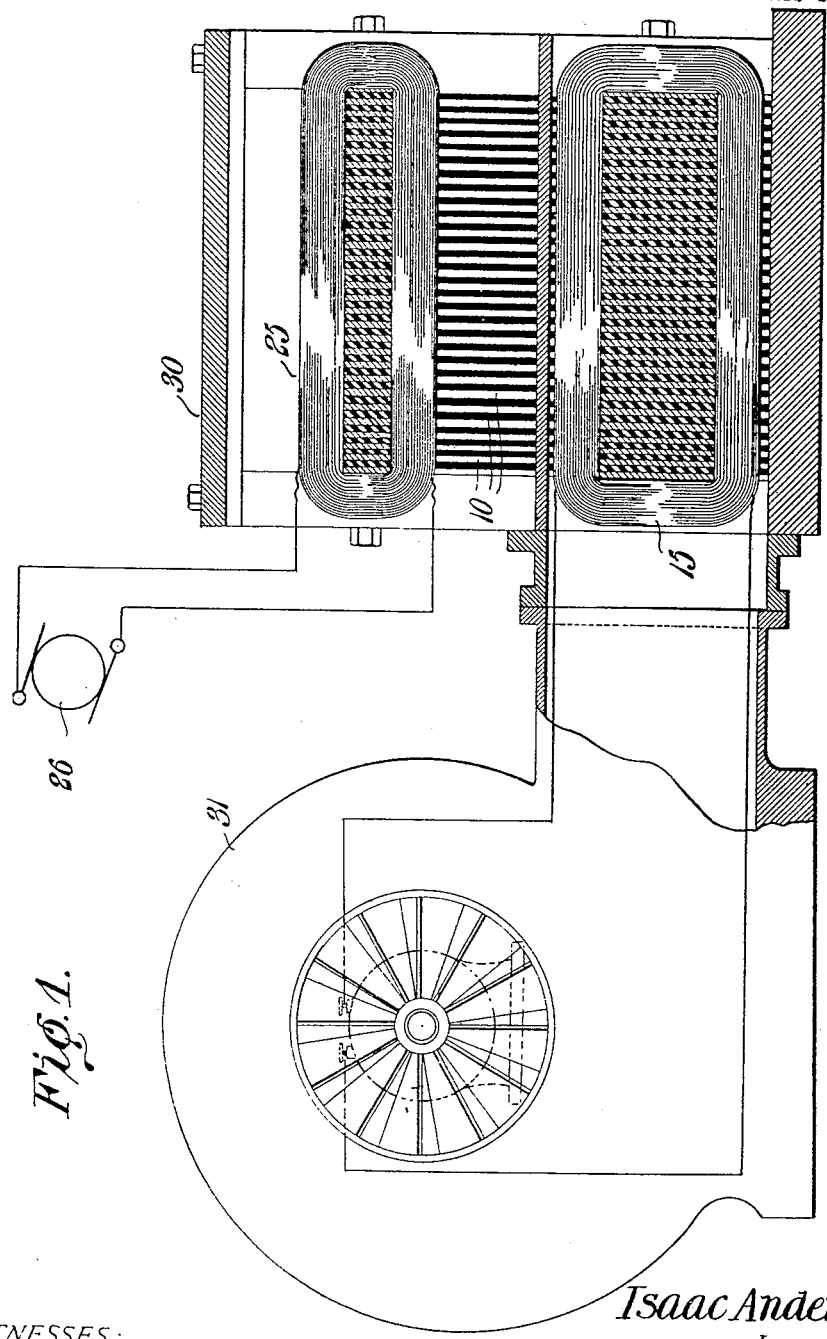

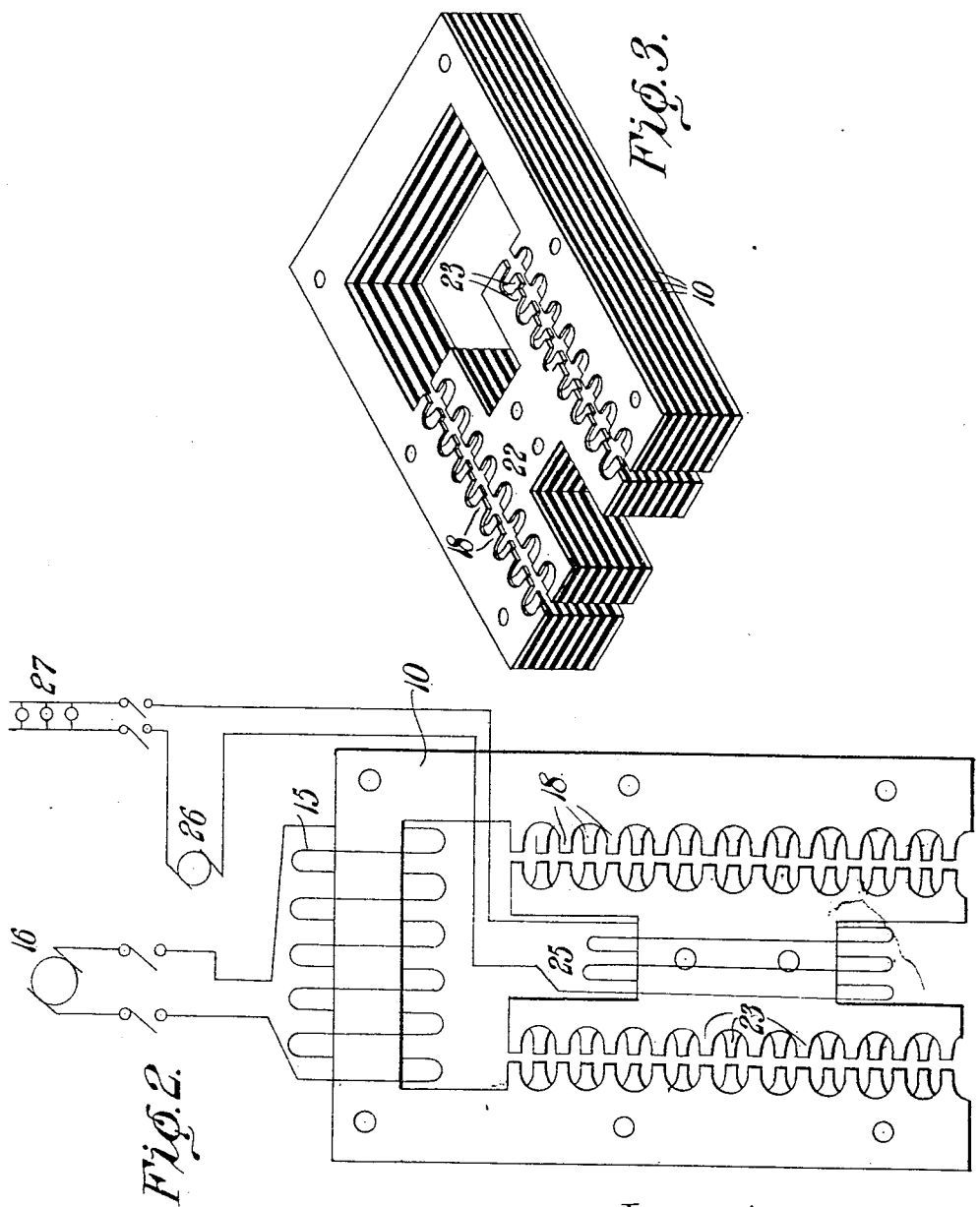

ISAAC ANDERSON, OF TACOMA, WASHINGTON, ASSIGNOR OF ONE-THIRD TO HANS ANSTENSON, OF PUYALLUP, WASHINGTON, AND ONE-THIRD TO ALFRED SUNDELL, OF TACOMA, WASHINGTON.

ELECTRIC TRANSFORMER.

No. 862,532.     Specification of Letters Patent.     Patented Aug. 6, 1907.

Application filed April 29, 1907. Serial No. 370,858.

*To all whom it may concern:*

Be it known that I, ISAAC ANDERSON, a citizen of the United States, residing at Tacoma, in the county of Pierce and State of Washington, have invented a new and useful Electric Transformer, of which the following is a specification.

This invention relates to electric transformers, and has for its principal object to provide a novel construction of transformer in which provision is made for driving a current of air between the pole pieces.

With this and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation, partly in section, of a transformer constructed and arranged in accordance with the invention. Fig. 2 is a sectional plan view of the same the fan being omitted and the connections illustrated in diagrammatic form. Fig. 3 is a detail perspective view of the core pieces.

Similar numerals of reference are employed to indicate corresponding parts throughout the several figures of the drawings.

In carrying out the invention, a large number of thin, soft iron plates 10 are employed to form the core of the primary coil of the transformer. These plates are U-shaped in form and are spaced from each other by insulating material. Around the cross bar is wound a coil 15 that is connected with a suitable source of energy, as for instance an alternator 16, so that the core becomes a horseshoe electro-magnet, the pole alternately changing with the current.

The inner edges of the side members of the U-shaped plates are provided with equi-distantly spaced recesses that form tongues 18 and the tongues of each plate are staggered with relation to the tongues of the plates immediately below and above it.

Arranged between the side bars of the plates 20 is a second series of plates 22 of a number equal to the number of plates 10, these plates having widened ends and reduced central portions, and the ends are provided with spaced tongues 23, of a number equal to the number of tongues 18, and these tongues are also disposed in staggered order, and are so arranged that they come opposite to said tongues 18. Around the central reduced portion of the plate is wound a secondary coil 25 that is preferably connected in series with a motor 26, and, if necessary, with a number of lamps 27 or other translating devices. The passage of an alternating current through the coils 15 will set up a current in the coil 25, and thus operate the motor, or the motor may be driven direct from the source of energy, if desired. These parts are mounted in a suitable frame that has bearings for the armature shaft of the motor, and said armature shaft carries a fan 29, which in revolving forces a current or currents of air between the tongues 18 and 23, so that the current of air will become highly heated. In order to direct the current of air in a proper course, all of the pole pieces are inclosed within a suitable casing 30 that is formed of wood, brass or other diamagnetic and non-conducting material, and said casing includes a hood 31 that covers the upper portion of the fan, the air being drawn in at one side of the casing near the hub of the fan and forced out through the hood and casing and passing into contact with all of the tongues 18 and 23, so that the air is not only heated, but is sterilized.

I claim:—

1. In a device of the class specified; a primary coil having a horseshoe core formed of spaced and insulated plates, the edges of which are notched to form a plurality of tongues, the tongues of the plates being disposed in staggered order, a second coil also having a core formed of spaced and insulated plates, the ends of which are notched to form staggered tongues, the tongues of one core being disposed opposite those of the other core, and means for causing the flow of a fluid between the pole pieces.

2. In a device of the class specified, a primary coil having a core composed of a series of soft iron plates of horseshoe form, the plates being spaced and insulated from each other and their edges being notched to form a plurality of tongues, the tongues of each plate being disposed in staggered relation with those of the adjacent plates, a secondary coil also having a core formed of a series of spaced and insulated plates, the plates of the secondary core being notched to form staggered tongues that are disposed opposite the tongues of the primary core, and means causing the flow of a current of fluid between the pole pieces.

In testimony that I claim the foregoing as my own, I have hereto affixed my signature in the presence of two witnesses.

ISAAC ANDERSON.

Witnesses:
    HANS AUSTENSON,
    ALFRED SUNDELL.